(12) United States Patent
Déjean

(10) Patent No.: US 7,536,369 B2
(45) Date of Patent: May 19, 2009

(54) XML-BASED ARCHITECTURE FOR RULE INDUCTION SYSTEM

(75) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 341 days.

(21) Appl. No.: 11/234,513

(22) Filed: Sep. 23, 2005

(65) Prior Publication Data

US 2007/0094201 A1   Apr. 26, 2007

(51) Int. Cl.
*G06N 5/02*   (2006.01)
*G06N 3/08*   (2006.01)

(52) U.S. Cl. .............................. 706/47; 706/16; 706/21; 706/25

(58) Field of Classification Search .................. 706/47, 706/16, 21, 25
See application file for complete search history.

(56) References Cited

U.S. PATENT DOCUMENTS

| | | |
|---|---|---|
| 5,719,692 A | 2/1998 | Cohen |
| 5,802,509 A | 9/1998 | Maeda et al. |
| 5,897,627 A | 4/1999 | Leivian et al. |
| 6,519,580 B1 | 2/2003 | Johnson et al. |
| 6,523,020 B1 | 2/2003 | Weiss |
| 6,792,576 B1 | 9/2004 | Chidlovskii |
| 2004/0015784 A1 | 1/2004 | Chidlovskii |
| 2004/0268236 A1 | 12/2004 | Chidlovskii et al. |

OTHER PUBLICATIONS

Dejean, "Learning Rules and Their Exceptions", 2002.*
Braga et al., "A Tool for Extracting XML Association Rules," IEEE Comp. Soc., US, vol. CONF. 14, pp. 57-64, (2002).
Chen et al., "Mining Association Rules from Structural Deltas of Historical XML Documents," PAKDD, pp. 452-457 (2004).
Ait-Mokhtar et al., "Incremental Finite-State Parsing," Proceedings of Applied Natural Language Processing (ANLP-97), Washington, D.C., 8 pages, Apr. 1997.
Ait-Mokhtar et al., "Robustness beyond Shallowness: Incremental Deep Parsing," *Natural Language Engineering* 8 (2/3), pp. 121-144, 2002.
Clark et al., "The CN2 Induction Algorithm," Machine Learning Journal 3 (4), pp. 261-283, 1989.
Cohen, "Fast Effective Rule Induction," Machine Learning: Proceedings of the Twelfth International Conference, pp. 10, ML95.
Dejean, "Learning Syntactic Structures with XML," In Proceedings of CoNLL-2000 (2000).
Sakamoto et al., "Extracting partial structures from HTML documents," DOI technical report, pp. 5, 2000.
Extensible Markup Language (SML), W3C Architecture domain, at http://www.w3.org/SML/, last visited Jun. 30, 2005.

(Continued)

*Primary Examiner*—David R Vincent
*Assistant Examiner*—Nathan H Brown, Jr.
(74) *Attorney, Agent, or Firm*—Fay Sharpe LLP

(57) ABSTRACT

In a rule induction method, an overbroad candidate rule is selected for categorizing a node to be categorized. The candidate rule is specialized by: (i) adding a rule node corresponding to a node level of structured training examples; (ii) including in a rule node a rule pertaining to an attribute of at least one node of the corresponding node level to produce a specialized candidate rule; and (iii) evaluating the specialized candidate rule respective to the structured training examples.

22 Claims, 2 Drawing Sheets

OTHER PUBLICATIONS

Dejean, "Learning Rules and Their Exceptions," Journal of Machine Learning Research 2, pp. 669-693, 2002.

Dejan, "ALLiS: A Symbolic Learning System for Natural Language Learning," Proceedings of CoNLL-2000 and LLL-2000, pp. 95-98, 2000.

Collier, "Machine Learning for Information Extraction from XML marked-up text on the Semantic Web," Semantic Web Workshop, pp. 8, 2001.

Edmonds, "XMLMiner & Metarule White Paper," Scientio, Inc., pp. 1-13, 2002.

Kushmerick, "Wrapper induction: Efficiency and expressiveness," Artificial Intelligence 118, pp. 15-68, 2000.

Muslea, et al., "STALKER: Learning Extraction Rules for . . . ," in AAAI'98 Workshop on AI and Information Integration, pp. 8, 1998.

Document Object Model (DOM), W3C Architecture domain, http://www.w3.org/DOM/, last visited Jun. 30, 2005.

Zaki et al., "XRules: An Effective Structural Classifier for XML Data," ACM, pp. 10, 2003.

* cited by examiner

XML-BASED ARCHITECTURE FOR RULE INDUCTION SYSTEM

BACKGROUND

The following relates to data classification, data mining, and related arts. It particularly relates to rule induction applied to structured XML data, and is described herein with particular reference thereto. However, the following is amenable to other like applications.

Rule induction involves automated determination of predictive rules. Typically, a training data set is used for learning the rule. Each example in the training set is described by a set of values for attributes (for example, Boolean, discrete, or continuous attributes), including an attribute of interest whose value or value range is to be predicted. A rule is constructed based on the training set which predicts that the attribute of interest will have a specified value or value range when specified other attributes have specified values or ranges.

For example, a training set listing persons may include examples each having attributes including attributes F3, F4, F6, and F10 where F3 indicates highest attained education level, F4 indicates number of years of education, F6 indicates job description, and F15 indicates salary level. The rule to be induced may be intended to predict when a person will have an income level greater than $50,000. One possible induced rule is:

IF F3="Doctorate" AND F4="16" AND F6="Exec-managerial"

THEN income>50K

In one approach, a general or overbroad initial candidate rule is refined by specialization to produce the final rule. For example, the initial candidate rule may be an empty rule which reads upon every example in the training set. Attribute-value pairs are conjunctively added to specialize the rule until a selected termination criterion is reached, such as the rule having a threshold level of prediction accuracy. The process may be repeated to produce a set of such rules, each rule being a conjunctive combination of attribute-value pairs.

Heretofore, rule induction has generally been applied to flat data, in which each example is defined by a set of attributes-value pairs. Such rule induction is difficult to apply to structured data. For example, extensible mark-up language (XML), hypertext mark-up language (HTML), and other structured formats provide structure in which the data is organized in a tree-like structure. For example, an XML document may have a root node defined as "document" having child nodes corresponding to sections of the document, such as "introduction", "chapter 1", "chapter 2", . . . , "conclusions", or so forth. Each child node, in turn, can have its own child nodes. For example, each chapter node may have child nodes corresponding to paragraphs, and so forth.

CROSS REFERENCE TO RELATED PATENTS AND APPLICATIONS

Chidlovskii et al., U.S. patent application Ser. No. 11/156,776 filed Jun. 20, 2005 entitled "A method for classifying sub-trees in semi-structured documents" is incorporated herein by reference. This application discloses among other aspects methods and apparatuses in which the tree structure is pre-processed, and each XML node is represented as a set of paths. Attributes are also considered as nodes. The learner can use the content of a node in order to categorize it.

Chidlovskii, U.S. Pat. No. 6,792,576 entitled "System and Method of Automatic Wrapper Grammar Generation", and Chidlovskii, U.S. Publ. Appl. 2004/0015784 A1 entitled "Method for Automatic Wrapper Repair", are each incorporated herein by reference, and disclose among other aspects processing in which structured data is treated as text.

Chidlovskii et al., U.S. Published Application 2004/0268236 A1 entitled "System and Method for Structured Document Authoring" is incorporated herein by reference. This application discloses among other aspects a method for learning tree transformation. A structured data tree is pre-processed and split into paths.

BRIEF DESCRIPTION

According to aspects illustrated herein, there is provided a rule induction method. An overbroad candidate rule is selected for categorizing a node to be categorized. The candidate rule is specialized by: (i) adding a new node using an XML structural interface; (ii) adding a new attribute to a node; (iii) evaluating the specialized candidate rule respective to a set of training examples; and (iv) terminating the specializing when the specialized candidate rule satisfies a termination criterion.

According to aspects illustrated herein, there is provided a rule induction system. A general-to-specialized rule inducer generates a rule categorizing a node to be categorized of an XML document by specializing an overbroad candidate rule respective to a set of training XML documents. The general-to-specialized rule inducer includes a rule node adder that selectively adds nodes and attributes to the candidate rule.

According to aspects illustrated herein, there is provided a rule induction method. An overbroad candidate rule is selected for categorizing a node to be categorized. The candidate rule is specialized by: (i) adding a rule node corresponding to a node level of structured training examples; (ii) including in a rule node an attribute of at least one node of the corresponding node level to produce a specialized candidate rule; and (iii) evaluating the specialized candidate rule respective to the structured training examples.

DETAILED DESCRIPTION

Figure 1:
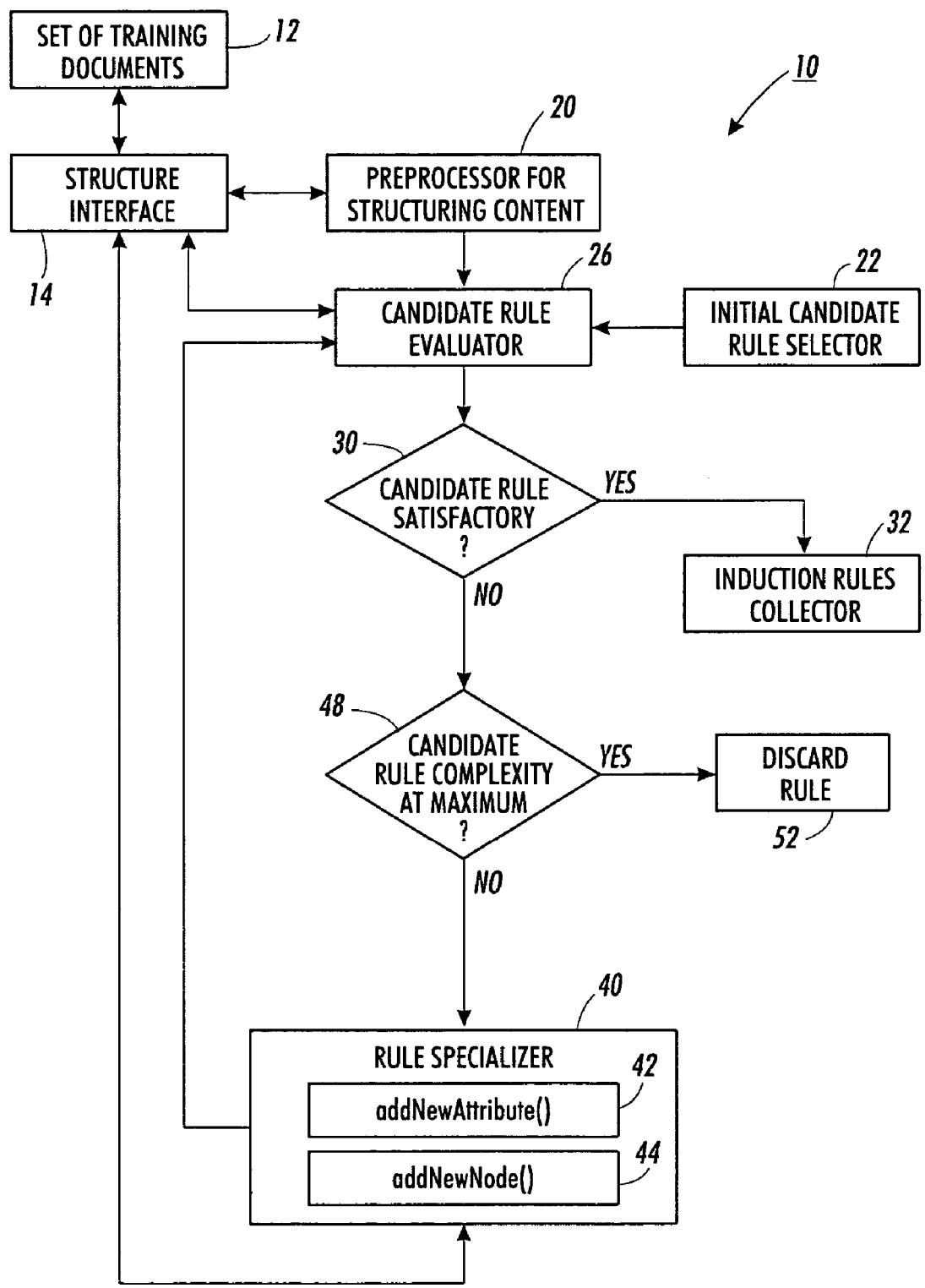
FIG. 1 diagrammatically shows a rule induction system capable of generating structured rules operating on XML data and including rule nodes corresponding to nodes other than the node to be categorized.

With reference to FIG. 1, a rule induction system 10 generates categorization rules by specializing an initial overbroad rule based on a set of training documents 12 that are accessible via a suitable XML structural interface 14, such as an XPath or Document Object Model (DOM) interface.

A pre-processor 20 optionally processes the training documents 12 to define attributes of nodes of interest for rule induction, to define additional segmenting nodes that extract content of interest for rule induction, or so forth. For natural language processing applications, for example, each content stream (#PCDATA) is suitably segmented into tokens using a linguistic tool such as the Xerox Incremental Parser (XIP), which is described for example in: Ait-Mokhtar et al., "Robustness beyond Shallowness: Incremental Deep Parsing, in Journal of Natural Language Engineering, Special Issue on Robust Methods in Analysis of Natural Language Data, ed. A. Ballim & V. Pallotta (Cambridge University Press, 2002), which is incorporated herein by reference; and Ait-Mokhtar, Incremental Finite-State Parsing, Proceedings of Applied Natural Language Processing (ANLP-97), Washington, D.C. April 1997, which is also incorporated herein by reference. Alternatively, tokenizers can be used for the segmenting. A list of separators can constitute sufficient segmenting. For each token a new node is appended to the structure with its specific attributes. Each token can also be split into smaller units such as letters (if the purpose is to learn morphological structure for instance). Each new node (word or letter) can be enriched with attributes. For example, each word node can be enriched with its part-of-speech (linguistic category such as noun, verb, preposition, or so forth), normalized form, presence in a specific terminological database, or so forth. Similarly each letter element can be enriched with attributes such as vowel, consonant, capital letter, or so forth.

Figure 2:
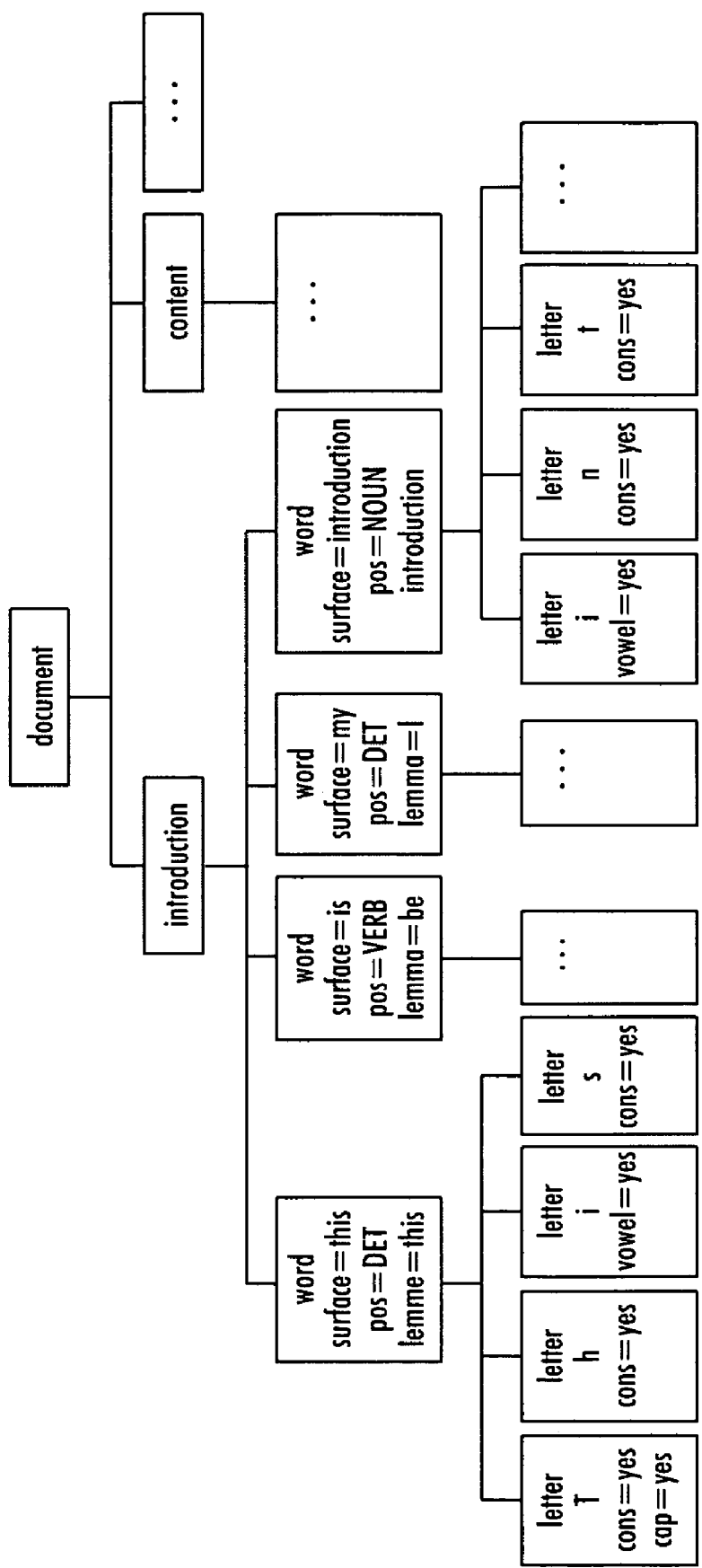
FIG. 2 diagrammatically shows a structure of pre-processed example XML training documents.

FIG. 2 illustrates an example output of this pre-processing. The pre-processing keeps the original document structure, and adds new leaves, such as the illustrated letter leaves, and/or new node attributes, such as the illustrated surface, pos (part-of-speech), and lemme attributes, to it. If a linguistic tool such as a parser is used for the pre-processing, then richer linguistic information can be integrated such as linguistic dependencies between linguistic elements set forth using IDREF attributes. Depending on the learning task, other pre-processing steps can be applied on content elements. For example, for document categorization, the #PCDATA node can be replaced by a node with the set of words or lemmas found in the #PCDATA, preprocessing which corresponds to the traditional bag-of-words representation usually used in document categorization. If the document is structured in titles, sections, paragraphs, or so forth, this structure can be retained.

If the set of training documents 12 is not initially in an XML format, then the pre-processor 20 suitably converts the training documents to XML format. Structured data such as databases are readily converted into XML format. Traditional benchmarks used in machine learning such as the UCI database employ an <attribute-value> formalism and can also be easily converted into XML. For example, an <attribute-value> formatted example such as:

25, Private, 226802, 11th, 7, Never-married, Machine-op-inspct, Own-child, Black, Male, 0, 0, 40, United-States, <=50K is suitably converted to XML according to:

```
<DATA>
    <EX F0="25" F1="Private" F2="226802" F3="11th"
    F4="7" F5="Never-married" F6="Machine-op-inspct"
    F7="Own-child" F8="Black" F9="Male" F10="0" F11="0"
    F12="40" F13="United-States" CAT="-"/>
</DATA>
```

For a training set including many such examples (which is usually the case), each example is similarly disposed within the <DATA></DATA> mark-up pair using the <EX /> example mark-up.

After the optional pre-processing, an initial candidate rule selector 22 selects an initial overbroad candidate rule for categorizing a node to be categorized. For example, a function buildEmptyRule( ) can be used to generate the initial overbroad candidate rule. A suitable overbroad initial rule constructed by the buildEmptyRule( ) function for the category GUIDENAME is:

```
<RULE CAT="GUIDENAME" VALUE="+">
    <NODE TBC="+">
</RULE>
``` where the attribute TBC designates the structured element or node that will be categorized by this rule. ("TBC" stands for "To Be Categorized"). The initial overbroad rule is specialized using a suitable learning algorithm, such as:

candidate=buildEmptyRule(category)
learnSetOfRule(candidate,pos,neg)

where the function learnSetOfRule is given by:

```
learnSetOfRule(candidate,pos,neg)
list ←candidate
while x in list do
    eval = evaluation(x,pos,neg)      //rule evaluation
    if eval> θ then
        setOfRules ←x
        cleanData(x,pos);             // delete covered
                                         positive examples
    else
        list ←specializeRule(x)       // add specialized
                                         rules in the
                                         candidate list
    end if
    delete(x,list)
end while
return setOfRule
``` where the function specializeRule( ) is given by:
specializeRule(rule)
    set=set+addNewAttribute(rule)
    set=set+addNewNode(rule)
Return set and the function addNewNode( ) is given by:
addNewNode(rule)
    set=emptySet( )
    set=set+addFather(rule)
    set=set+addChild(rule)
    set=set+addPrevSibling(rule)
    set=set+addNextSibling(rule)
    return set and the function addNewAttribute( ) is given by:
addNewAttribute(rule)
    set=emptySet( )
    set=addAttribute(rule)
    return set The algorithms set forth above are suitably implemented in ALLiS, which is described for example in: Déjean, "Learning Rules and Their Exceptions", Journal of Machine Learning Research vol. 2, pp. 669-93 (2002); and Déjean, "ALLiS: a Symbolic Learning System for Natural Language Learning", in Proceedings of CoNLL-2000, Lisbon, Portugal (2000) pp. 95-98, both of which are incorporated by reference herein. ALLiS stands for "Architecture for Learning Linguistic Structures" and is a symbolic machine learning system which generates categorization rules from a tagged and bracketed corpus. Alternatively, the algorithms can be implemented using other systems suitable for implementing rule induction, such as Prolog. The example learnSetOfRule( ) function implements a general-to-specific learning approach. Other learning functions that include a specialization operation, such as decision tree algorithms, can also be used.

With continuing reference to FIG. 1, the evaluation( ) function serves as a candidate rule evaluator 26, and can be implemented in various ways to compute a score for the rule. Accuracy, Laplace estimate, m-estimate, information-gain, or so forth, can be used as scoring criterion. In a decision operator 30, if the score of a candidate rule is greater than or equal to a threshold value θ, then an induction rules collector 32 puts the candidate rule into the set of rules. Otherwise it is specialized by adding a new piece of information using the specializeRule( ) function.

With continuing reference to FIG. 1, the specializeRule( ) function serves as a rule specializer 40 that specializes a candidate rule and adds the set of new candidate rules into the candidates list. A new piece of information may, for example, correspond to an attribute-value pair describing a training example. The attribute-value pair is added by the addNewAttribute( ) function 42. More generally, the rule specializer 40 can specialize the candidate rule by adding substantially any kind of information provided by the XML training data 12. This generalized capability is provided by a rule node adder such as the illustrated addNewNode( ) function 44. When the rule is specialized by adding information which corresponds to an ID or IDREF, the resulting rule is not a tree, but a forest describing a structured rule.

Rule specialization is done until a termination criterion is satisfied. The termination criterion may include, for example, the decision operator 30 which terminates the specialization when the candidate rule's frequency in the training data reaches a given threshold. Additionally or alternatively, another decision operator 48 may terminate the specialization of a candidate rule when the rule has a maximum number of elements (nodes and attributes), a maximum number of nodes, or so forth. In this case, the rule candidate is discarded 52. The termination criterion thresholds and the maximum complexity of the decision operator 48 are suitably user selectable parameters.

The rule specializer 40 generates a new candidate rule with a new attribute and a new value, which depends upon the kind of attribute. Table I outlines how the rule specializer 40 specializes the candidate rule by adding nodes of various types.

TABLE I

| XML Node | Action |
| --- | --- |
| Father node | For each different label of the fathers, a new candidate is added |
| Children nodes | For each different label of each child, a new candidate is added |
| Sibling nodes | For each different label of each previous and next sibling, a new candidate is added |

Table II outlines how the rule specializer 40 specializes the candidate rule by adding attributes of various types.

TABLE II

| XML Attribute | Explanation | Action |
| --- | --- | --- |
| CDATA | CDATA stands for character data, that is, text that does not form markup | For each value of the attribute, a new candidate is added |
| IDREF | IDREF is used to establish connections between elements. The IDREF value of the attribute must refer to an ID value declared elsewhere in the document | A conjunctive element is added with the referred element |
| IDREFS | Allows multiple ID values separated by whitespace | Iteration over IDREF values |
| NTOKEN | The first character of an NMTOKEN value must be a letter, digit, '.', '-', '_', or ':' | Idem as CDATA |
| NTOKENS | Allows multiple NMTOKEN names separated by whitespace | Iteration over NTOKEN values |
| ID | ID is a unique identifier of the attribute | Idem as IDREF |
| ENTITIES | ENTITYs are used to reference data that act as an abbreviation or can be found at an external location. | Entities are solved during parsing (idem as CDATA) |
| ENUMERATED | Enumerated attribute types allow you to make a choice between different attribute values. The first character of an Enumerated value must be a letter, digit, '.', '-', '_', or ':' | Idem as CDATA |

Information about the new elements that are added in order to create a more specialized candidate rule is collected by querying the training data 12 via the Xpath, DOM, or other structure interface 14.

As an example, starting with the initial overbroad candidate rule:

<NODE TBC='+'/> the following list shows examples of some new candidates suitably generated by specialization:

<NODE TBC='+' W='Guide'/>
<NODE TBC='+' Up='+'/>
<NODE W='Select'/><NODE TBC='+'/>
<NODE TBC='+'/><NODE W='Guide'/>
<p><NODE TBC='+'/></p>
<TREE><NODE TBC="+" VERB="_X1 "/></TREE> |
<TREE><NODE ID="_X1" LEMMA="consist"/></TREE>

Each new candidate is evaluated by the candidate rule evaluator 26, and if its score is not high enough as assessed by the decision operation 30, the new candidate rule is further specialized by the rule specializer 40, up to the maximum complexity specified by the decision operator 48.

The following is an example of a structured rule including a plurality of rule nodes that is suitably generated by the rule induction system 10 of FIG. 1.

```
<RULE CATEGORY="GUIDENAME">
    <section>
        <section>
            <list-unordered>
                <item>
                    <p>
                        <NODE TBC="+" Up="+"/>
                        <NODE W="Guide"/>
                    </p>
                </item>
            </list-unordered>
        </section>
    </section>
    <section cond-display="hide">
        <quiz/>
    </section>
</RULE>
```

In this rule, a word (element NODE with the attribute TBC) with some specific attributes (Uppercase) in a "content" context (followed by the word "Guide") and in a relatively complicated structural context is categorized in a given category (Guide Name).

The ID and IDREF attributes enable introduction of variables into the rule formalism. In XML, the type IDREF refers to an ID, unique identifier of a node element. An example of ID/IDREF attributes usage in XML is:

```
<Node lemma="The" ID="_1"/>
<Node lemma="ABC" ID="_2"/>
<Node lemma="gene" ID="_3"/>
<Node ID="_X2" lemma="encode" ID="_4"/>
<Node lemma="this" ID="_5"/>
<Node lemma="protein" ID="_6"/>
<DEPENDENCY PAR1="_1" PAR2="_2" name='MODIFIER'/>
<DEPENDENCY PAR1="_2" PAR2="_3" name='MODIFIER'/>
<DEPENDENCY PAR1="_3" PAR2="_4" name='SUBJ'/>
<DEPENDENCY PAR1="_5" PAR2="_4" name='OBJ'/>
<DEPENDENCY PAR1="_5" PAR2="_6" name='MODIFIER'/>
``` where the parameters PAR1 and PAR2 are IDREF attributes, and ID is an ID attribute.

Suitable processing for the ID/IDREF attributes during rule induction is as follows. The attribute of type IDREF or ID is added into the rule. In this example, the attribute of type ID="_3" is added as follows:

<NODE lemma="gene" ID="_3">

The list of referred elements is collected (IDREF for ID or ID for IDREF). In this example, the referred elements of ID="_3" are:

<DEPENDENCY PAR1="_3" PAR2="_4" NAME="SUBJECT"/>
    <DEPENDENCY PAR1="_2" PAR2="_3" NAME="MODIFIER"/>
    . . .

For each referred element, a conjunctive rule is added with the ID/IDREF attribute:

<TREE><NODE lemma="gene" ID="_3"></TREE>
    <TREE><DEPENDENCY ID1="_3"/></TREE>

The added new rule is specialized by the rule specializer 40 as with other rules:

<TREE><NODE ></TREE><TREE><DEPENDENCY PAR1="_3" NAME="SUBJECT"/></TREE>
    <TREE><NODE ></TREE><TREE><DEPENDENCY PAR2="_3" NAME="MODIFIER" /></TREE>
    . . .

The value of the ID/IDREF attribute is replaced by a variable (existential quantification). Typically, the first variable is named "_X1", the second "_X2", and so forth. The list of these variables is added into the candidate head. A universal quantifier is associated each variable implicitly. The new candidates are added into the candidates list. With ID/IDREF processing, the learned rules are no longer a tree but a forest, where a twig of one tree is linked with a twig in one other tree.

An example of rule in ALLiS formalism with IDREF variable is:

```
<RULE NUM="23" CATEGORY="BIOENTITY" FREQ="12" SCORE="0.91" VARIABLES="_X1_X2">
    <TREE>
        <Node TBC="+"/>
        <Node lemma="gene" ID="_X1"/>
    </TREE>
    <TREE>
        <DEPENDENCY PAR1="_X1" PAR2="_X2" name='SUBJ'/>
    </TREE>
    <TREE>
        <Node ID="_X2" lemma="encode"/>
    </TREE>
</RULE>
```

This rule is composed of three conjunctive parts (TREE elements), and two variables, _X1 and _X2. It can be read as: a word followed by the word "gene" which is the subject of a verb "encode" belongs to the BIOENTITY category.

Embodiments of the rule induction system disclosed herein have been tested on several collections. In one test, the goal was to structure the bibliography part of documents provided by the European Patent Office. The problem was then to categorize structural XML elements. Evaluation is given Table III, with and without the use of content.

TABLE III

|  | Precision | Recall | F1-score |
|---|---|---|---|
| Without content | 0 | 0 | 0 |
| With content | 95 | 94 | 94.5 |

In Table III, F1-score indicates the harmonic means. In another test, this one employing a BioTIP™ collection of bioinformatics content developed by Xerox Corporation, the goal was to tag biological entities such as genes, proteins, and RNA, in articles abstracts of the BioTIP™ collection. Evaluation is given Table IV.

TABLE IV

|  | Precision | Recall | F1-score |
|---|---|---|---|
| With structure | 86.21 | 69.98 | 76.68 |
| Without structure | 87.90 | 63.47 | 73.71 |

This test shows that the combination of structural information and content information can improve the prediction performance of a set of rules. If precision decreases slightly (−1.5%), recall is improved by +6.5% and F1 (harmonic means) is improved by +3%.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A rule induction method performed by a machine learning system configured to perform categorization using learned rules, rule induction method comprising:

selecting an overbroad candidate rule for categorizing a node to be categorized;

specializing the candidate rule by:
  (i) identifying a related node other than the node to be categorized using an XML structural interface, the related node being (1) one of a parent node, a child node, and a sibling node of the node to be categorized, or (2) one of a parent node, a child node, and a sibling node of a previously identified related node,
  (ii) adding one or more candidate rules associated with attributes of a rule node,
  (iii) evaluating the specialized candidate rule respective to a set of training examples, and
  (iv) terminating the specializing when the specialized candidate rule satisfies a termination criterion to generate a specialized rule; and categorizing or predicting an attribute of an object using the specialized rule.

2. The rule induction method as set forth in claim 1, wherein the XML structural interface used in the identifying is one of XPath and Document Object Model (DOM).

3. The rule induction method as set forth in claim 1, further comprising:
  pre-processing the set of XML training examples to define segmenting nodes that extract content of interest for rule induction.

4. The rule induction method as set forth in claim 3, further comprising:
  pre-processing the segmenting nodes set of XML training examples to define attributes of the segmenting nodes of interest for rule induction.

5. The rule induction method as set forth in claim 1, further comprising:
  pre-processing the set of XML training examples to define attributes of nodes of interest for rule induction.

6. The rule induction method as set forth in claim 1, wherein the identifying of a related node comprises:
  identifying one of a parent node, a child node, and a sibling node of the node to be categorized.

7. The rule induction method as set forth in claim 1, wherein the identifying of a related node comprises:
  identifying one of a parent node, a child node, and a sibling node of a previously identified related node.

8. The rule induction method as set forth in claim 1, wherein the identifying of a related node identifies a parent node, and the adding comprises:
  adding a candidate attribute-value rule corresponding to each parent node label.

9. The rule induction method as set forth in claim 1, wherein the identifying of a related node identifies a child node, and the adding comprises:
  adding a candidate attribute-value rule corresponding to each child node label.

10. The rule induction method as set forth in claim 1, wherein the identifying of a related node identifies a sibling node, and the adding comprises:
  adding a candidate attribute-value rule corresponding to each sibling node label.

11. The rule induction method as set forth in claim 1, wherein the adding comprises:
  adding a candidate attribute-value rule for each value of a CDATA attribute of the related node.

12. The rule induction method as set forth in claim 1, wherein the adding comprises:
  adding a candidate attribute-value rule for each value of an NTOKEN attribute of the related node.

13. The rule induction method as set forth in claim 1, wherein the adding comprises:
  adding a conjunction of attribute-value rules corresponding to each value of an ID or IDREF attribute of the related node.

14. The rule induction method as set forth in claim 1, wherein the termination criterion includes a number of related nodes having attributes subject to one or more candidate rules exceeding a threshold value.

15. A categorization system comprising:
  a pre-processor configured to pre-processee a set of XML training examples to define segmenting nodes that extract content of interest for rule induction;
  a machine learning system configured to generate a rule categorizing a node to be categorized of an XML document by specializing an overbroad candidate rule respective to the set of training XML documents preprocessed by the pre-processor, the machine learning system selectively adding nodes to the candidate rule, the added nodes including attribute-value pairs relating to attributes of nodes of the training XML documents other than the node to be categorized; and
  a categorizer configured to categorize or predict an attribute of an XML document using the rule generated by the machine learning system.

16. The categorization system as set forth in claim 15, further comprising:
  an XML structural interface accessed by the machine learning system to identify structural elements of the set of training XML documents.

17. The categorization system as set forth in claim 16, wherein the XML structural interface is one of XPath and Document Object Model (DOM).

18. The categorization system as set forth in claim 15, wherein the machine learning system selectively adds one of:
  a parent node, a child node, or a sibling node of the node to be categorized.

19. A categorization or prediction method performed by a machine learning system, the categorization or prediction method comprising:
  selecting an overbroad candidate rule for categorizing a node to be categorized;
  specializing the candidate rule by:
    (i) adding a rule node corresponding to a node level of structured training examples,
    (ii) including in the added rule node a candidate attribute-value rule corresponding to each label of the node level to produce a specialized candidate rule,
    (iii) evaluating the specialized candidate rule respective to the structured training examples; and
  categorizing or predicting an attribute of an object using the rule induced by the selecting and specializing.

20. The categorization or prediction method as set forth in claim 19, wherein the node level is one of a parent node level, a child node level, and a sibling node level respective to the node to be characterized.

21. The categorization or prediction method as set forth in claim 19, wherein the including comprises:
  including in the added rule node a conjunction of attribute-value rules corresponding to each value of an ID or IDREF attribute of a node of the node level.

22. The categorization or prediction method as set forth in claim 19, further comprising:
  repeating the adding and including until the specialized candidate rule is satisfactory or has a pre-selected maximum number of nodes.

* * * * *